United States Patent [19]
Ford et al.

[11] Patent Number: 5,481,613
[45] Date of Patent: Jan. 2, 1996

[54] COMPUTER NETWORK CRYPTOGRAPHIC KEY DISTRIBUTION SYSTEM

[75] Inventors: Warwick S. Ford; Michael J. Wiener, both of Nepean, Canada

[73] Assignee: Northern Telecom Limited, Montreal, Canada

[21] Appl. No.: 227,871

[22] Filed: Apr. 15, 1994

[51] Int. Cl.$^6$ .................................................. H04L 9/30
[52] U.S. Cl. .............................................. 380/30; 380/21
[58] Field of Search ........................................ 380/21, 30

[56] References Cited

U.S. PATENT DOCUMENTS

| | | | |
|---|---|---|---|
| 4,200,770 | 4/1980 | Hellman et al. | 380/30 |
| 4,405,829 | 9/1983 | Rivest et al. | 380/30 |
| 4,607,137 | 8/1986 | Jansen et al. | 380/21 |
| 5,144,665 | 9/1992 | Takaragi et al. | 380/30 |
| 5,200,999 | 4/1993 | Matyas et al. | 380/30 |
| 5,265,164 | 11/1993 | Matyas et al. | 380/30 |
| 5,315,658 | 3/1994 | Micali | 380/30 |
| 5,341,426 | 8/1994 | Barney et al. | 380/30 |
| 5,373,559 | 12/1994 | Kaufman et al. | 380/30 |

*Primary Examiner*—Salvatore Cangialosi
*Attorney, Agent, or Firm*—Yoshiharu Toyooka

[57] ABSTRACT

Novel cryptographic key distribution techniques to be used in large computer networks are disclosed. The techniques require trusted key release agent systems in each security domain. The encryptor of a data message nominates the set of authorized decryptors, using a set of access control attributes recognized by a key release agent in a target security domain. Data enabling the message decryption key and the access control attributes to be recovered are sent to the decryptor in an access controlled decryption block, which is encrypted under a separate key. The access controlled decryption block can only be decrypted by a key release agent in the correct security domain. The key release agent recovers the decryption key and supplies it to an authorized decryptor, which allows the decryptor to recover the original data message.

19 Claims, 8 Drawing Sheets

COMPUTER NETWORK CRYPTOGRAPHIC KEY DISTRIBUTION SYSTEM

FIELD OF THE INVENTION

The present invention relates generally to computer networks in which cryptographic techniques are used for data confidentiality purposes. More specifically, the invention is directed to a computer network in which decryption of data is only possible when a decryptor is authorized in accordance with a set of access control attributes specified by the encryptor.

BACKGROUND OF THE INVENTION

Cryptographic techniques constitute a major building block used in implementing all security services in computer networks. The basic function provided by a cryptographic system (or cryptosystem) is encipherment/decipherment. A cryptosystem comprises a pair of data transformations, encryption and decryption, respectively. Encryption is applied to a data item, known as plaintext, and generates a new (unintelligible) data item, ciphertext. Decryption, applied to ciphertext, results in the regeneration of the original plaintext. An encryption transformation uses as input both the plaintext data and an independent data value known as an encryption key. Similarly, a decryption transformation uses a decryption key. There are two basic types of cryptosystems—symmetric systems and public key (or asymmetric) systems. In symmetric cryptosystems the same key is used in the encryption and decryption transformations. A public key system has a key pair comprising a public key and a private key. One of these keys is used for encryption and the other for decryption. The public key does not need to be kept confidential.

To provide confidentiality, a symmetric cryptosystem works as follows. Two parties, A and B, want to communicate securely. By some process (e.g., by a secure channel or a trusted courier), they both obtain knowledge of a data value to be used as a key. The key is kept secret from all parties other than A and B. This enables either A or B to protect a message sent to the other party by encrypting it using the shared key. The other party can decrypt the message, but outside parties cannot. A well known symmetric cryptosystem is the U.S. Data Encryption Standard (DES).

In a public key cryptosystem there are two basic modes of operation, an encryption mode and an authentication mode. In the encryption mode, the data originator uses the public key for encryption and the recipient uses the private key of the same key pair for decryption. In this system, knowledge of the public key is not enough to deduce the private key. Therefore, the encryptor knows that data encrypted with a public key can only be decrypted by the holder of the corresponding private key. It is also possible to authenticate the encryptor in the authentication mode of operation. In this mode, the encryptor sends ciphertext encrypted by the private key of the key pair. The decryptor (recipient) then knows that data encrypted with the private key can be decrypted by anyone but could only have been sent by the holder of the private key. A cryptosystem of this kind which can operate in both encryption and authentication modes is known as a reversible public key cryptosystem.

One well known reversible public key cryptosystem is the RSA system described in U.S. Pat. No. 4,405,829 issued on Sep. 20, 1983 to Rivest et al. An RSA key pair is created as follows. An integer e is chosen, to be the public exponent. Two large prime numbers, p and q, are randomly selected, satisfying the conditions that (p−1) and e have no common divisors, and (q−1) and e have no common divisors. The public modulus is the value n=pq. The values of n and e together form the public key. A private exponent d is then determined, such that de−1 is divisible by both p−1 and q−1. The values of n and d (or p and q) together constitute the private key. The exponents have the important property that d functions as the inverse of e, that is, for any message M, $(M^e)^d$ mod n=M. The encryption process for message M involves calculating $M^e$ mod n. This can be carried out by anyone who knows the public key, i.e., n and e. Decryption of message M' involves calculating $M'^d$ mod n. This requires knowledge of the private key.

Cryptographic techniques all depend upon cryptographic keys. The keys must be made known in advance (distributed) to the parties that will use them and at the same time they must be protected as necessary against disclosure and/or substitution. Therefore key management, particularly key distribution, is very important. With purely symmetric systems, if the number of keys in a network is to be kept manageable, it is necessary to use trusted key centers for key distribution. For any two systems to communicate securely, they must share a master keying relationship with a key center. Furthermore, that key center must be on-line at the time secure communications are to be established. Distribution of public keys is simpler and does not require trusted on-line servers. Distribution of a public key does not require confidentiality, but it does require integrity—the user of a public key must be assured that it is the correct public key for the remote party concerned. For this reason, a public key is usually distributed in the form of a certificate which is digitally signed by a trusted certification authority. Certificates can then be distributed by unsecured means, such as a public directory service. A user of a certificate can be assured the certificate contents have not been changed, by verifying the certification authority signature. Installation of a new private/public key pair is straightforward; keys are typically generated within the owner system or a certification authority system. The only secure key transfer necessary is the transfer of one key from either the owner system to the certification authority system, or vice versa. These two systems are usually in the same network, and are typically close to one another.

In comparison with symmetric cryptosystems, public key systems have the advantage of simpler key distribution. However, countering this advantage, symmetric systems have the advantage of lower processing overheads. This makes symmetric systems particularly attractive for the bulk encryption/decryption of large volumes of data.

To benefit from all the advantages, a hybrid approach may be used. Symmetric cryptosystems are used for protecting bulk data and public key systems are used for distributing the symmetric keys (primary keys). For example, if a party A wants to establish a symmetric encryption key with party B, using RSA, it can do so as follows. Party A obtains a copy of party B's public key by obtaining the necessary certificate (possibly sent directly from Party B) and checking the certificate signature (or the signatures on a chain of certificates) to ensure the key is valid. Party A then generates a random symmetric key, and sends it to Party B, encrypted under Party B's public key. Only Party B can learn the symmetric key value, as only Party B knows the private key needed to decipher the message (the encrypted symmetric key value). Hence the two parties establish shared knowledge of the symmetric key, and can proceed to use it for protecting data communicated between them.

Another well known scheme of establishing a symmetric primary key is known as the Diffie-Hellman key derivation technique described in U.S. Pat. No. 4,200,770 issued Apr. 29, 1980 to Hellman et al. This works as follows. Parties A and B agree, in advance, upon a prime number p and a primitive element a in GF(p). Prime p should be such that p−1 has a large prime factor. This agreement could be on the basis of published system-wide constants, or could result from previous communications. As the first step in deriving a key, party A generates a random number x, $0 \leq x \leq p-1$. It then calculates $a^x$ mod p, and sends this value to party B. Party B generates a random number y, $0 \leq y \leq p-1$, calculates $a^y$ mod p, and sends this value to party A. Then party A calculates $(a^y)^x$ mod p and party B calculates $(a^x)^y$ mod p. Both parties now know a common key, $K = a^{xy}$ mod p.

In the traditional electronic mail encryption key distribution method, all message recipients have key pairs of a reversible public key cryptosystem (such as RSA). The message is encrypted using a symmetric cryptosystem, and copies of the encryption key, encrypted under the public key of each recipient, are attached to the message. Each legitimate recipient can recover the encryption key by decrypting the applicable copy of it with his private key. This method has several shortcomings. Firstly, the only access control model it can support is a simple list of authorized decryptors; other models are often required, such as specifying group membership, role membership, or security clearance. Secondly, every recipient must hold sensitive information, namely the private key of a key pair; compromise of any recipient's private key results in the compromise of all encrypted messages ever sent to that recipient. Thirdly, the encrypting system must obtain and verify, for every authorized recipient, a public key certificate; this can be a lengthy process, given the need to process multiple certificate chains and revocation lists. Fourthly, every participating user is required to possess the encryption and decryption capabilities of a reversible public key cryptosystem. There may be a risk of such cryptographic capabilities being used for unintended encryption purposes.

The present invention addresses these problems and others which will become apparent in the following detailed description. The invention relates to a key distribution method which enables an encryptor of a data item to specify, in terms of any desired access control model, the set of authorized decryptors. The present invention makes use of trusted servers called key release agents. While the invention is not restricted to use within any particular application environment, it is most naturally applicable to environments where broad user populations inherently have access to encrypted information, e.g., file servers, bulletin boards, or groupware applications.

The present invention also provides for controlled release of decryption keys under special circumstances, such as authorized interception by law enforcement agencies. This can be achieved by building a special key release condition into the key release agent's decision process. When used for this purpose, the present invention overcomes deficiencies apparent in the key-escrow system described in the U.S. Government FIPS 185 Escrowed Encryption Standard which addresses the same requirements.

OBJECTS OF THE INVENTION

It is therefore an object of the present invention to provide a method and a system of securely distributing through a computer network an encryption key to decryptors who are authorized according to a set of access control attributes specified by the encryptor.

It is another object of the present invention to provide a method and a system of a decryptor recovering an encryption key from a key release agent in a secure manner.

It is yet a further object of the present invention to provide a method and a system of a key release agent recovering an encryption key from an encrypted access controlled decryption block which contains the access control attributes.

It is still a further object of the present invention to provide a method and a system of a key release agent releasing an encryption key to a party other than a decryptor that is explicitly authorized by the encryptor.

SUMMARY OF THE INVENTION

Briefly stated, the present invention relates generally to a computer network which includes an encryptor, multiple decryptors and one or more key release agents. In one aspect, the invention is directed to a method of publicly distributing a message encryption key through the computer network. The method comprises a step of the encryptor distributing an identifier associated with a key-release public-private key pair and distributing therewith an access controlled decryption block, the latter of which has been created using the key-release public key and contains key data related to the message encryption key and a statement of access control criteria with respect to the decryptor. The method further includes steps of the decryptor sending to the key release agent the identifier and the access controlled decryption block in a locally protected transaction, the identifier indicating a key release private key corresponding to the key-release public key. The method includes additional steps of the key release agent recovering the message encryption key from the access controlled decryption block by using the key release private key and the key data in the access controlled decryption block, and sending to the decryptor the message encryption key if the decryptor is authorized to decrypt a message which is encrypted under the message encryption key.

According to another aspect, the present invention is directed to a computer network in which a message encryption key is distributed between an encryptor and a decryptor by way of a key release agent. The computer network comprises the encryptor which includes a transmitting device for transmitting to the decryptor through the network a ciphertext, an access controlled decryption block, and an identifier associated with a key release public-private key pair. The access controlled decryption block contains a set of access control attributes and key data related to the message encryption key. The encryptor further includes message encryption device for producing the ciphertext using the message encryption key and ACD generation device for generating the access controlled decryption block using the key release public key. The decryptor has transaction device for sending the access controlled decryption block and the identifier together with a set of decryptor attributes to the key release agent in a locally-protected transaction. The key release agent has the key release private key and ACD processing device for recovering the message encryption key and access control attributes by using the key release private key. The key release agent further includes a determining device for deciding, based on the decrypted access control attributes and the decryptor attributes, whether the decryptor is authorized to decrypt the ciphertext and transmitting device for sending to the decryptor the message encryption key in a locally-protected transaction.

DETAILED DESCRIPTION OF THE PREFERRED EMBODIMENTS OF THE INVENTION

Figure 1:
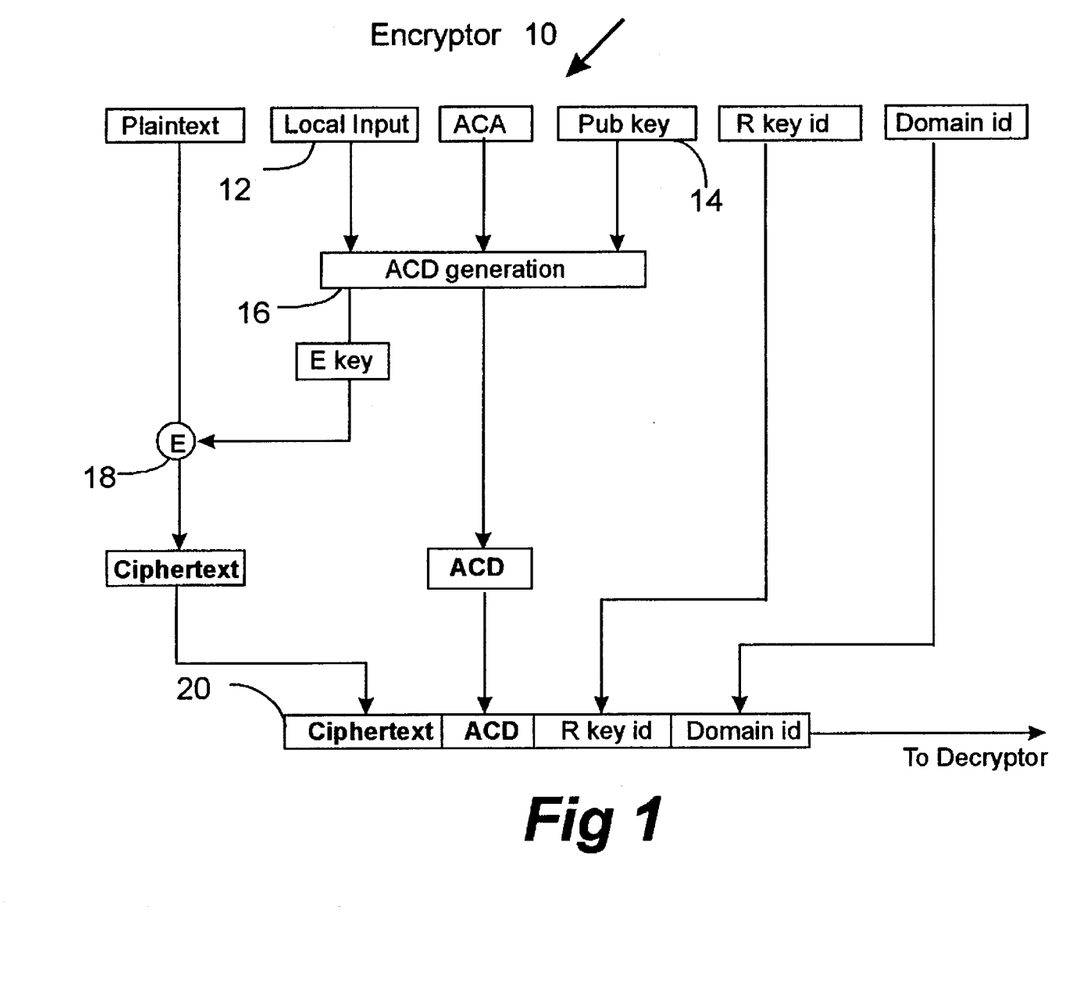
FIGS. 1 and 2 are functional schematic diagrams of an encryptor, a decryptor and a key release agent according to a generic embodiment of the present invention.

FIG. 1 is a functional schematic diagram of the encryptor according to one embodiment of the present invention. In this embodiment, an encryptor 10 determines access control criteria and generates ACA (access control attributes) to reflect such criteria. The encryptor 10 generates a local input 12 which is input, together with the ACA and a key release public key 14 to a function 16 which generates an E key (message encryption key) and a protected data construct called an ACD (access controlled decryption) block. A plaintext to be confidentiality-protected is encrypted at 18 to produce a ciphertext in a symmetric cryptosystem using the E key. An R key is a private key of a key-release key pair and is held by a trusted server system in the specified domain called a KRA (key release agent). Each KRA holds a copy of each R key used in its domain in a secure manner (e.g., in a hardware cryptomodule). Certified copies of the corresponding key-release public keys are made available to encryptors. The KRA will also be described in detail below. Thus when generating the ACD block, the encryptor selects a key-release public key, which comes with an identifier for the corresponding R key and verifies the signature on the applicable public key certificate. Stated more clearly, the key release private key (R key) and the key release public key (Pub key) form a key release key pair which is a key pair of a public-key cryptosystem used in protecting an access controlled decryption block (ACD) against use or modification by any system other than a recognized key release agent (KRA). The key release public key is made available to encrypting systems (encryptors) and used by them in generating access controlled decryption blocks while the key release private key (R key) is made known only to authorized key release agents (KRA).

The ACA may comprise an access control list and/or security label set. The ACA are capable of supporting the following types of access control policies (or a combination thereof):

individual-based policy: a list of names of individuals authorized to decrypt;

group-based policy: a list of names of groups of authorized individuals; the set of individuals constituting a particular group is maintained by one or more individuals specially authorized for this purpose;

role-based policy: a list of role identifiers; each role implies a set of attributes that a decryptor must possess (for example, in a banking environment, distinct roles might be "teller", "branch manager", "auditor", and "customer");

context-based controls, e.g., location of decryptor and/or time of day; and multi-level policy: the decryptor must have a clearance to a particular level, e.g., "unclassified", "confidential", "secret", and "top secret".

The ACD block is accompanied at 20 by an identifier of a security domain (Domain id.) and an identifier of a key-release private key (R key id.). The ciphertext, ACD block, R key id. and Domain id. are sent to the decryptor. As they can be made freely accessible to any party, they can be sent through a nonsecured electronic mail system or by posting them on a public file server. In the figure and figures which follow, all encrypted data and data which contains a Diffie-Hellman exponential are indicated in bold. In other words, the key release agent is a server system in a computer network which is trusted to deliver decryption keys to decrypting systems only when the identity and attributes of the decrypting system (decryptor) match a set of access control criteria determined by the encrypting system at the time of encrypting. The access control criteria are reflected in access control attributes (ACA) described above which in turn form part of access control decryption block (ACD). ACD, on the other hand, is a data structure which accompanies an encrypted message as it traverses a computer network from an encrypting system (encryptor) to a decrypting system (decryptor). This data structure, which is generated by the encrypting system, contains a statement of the access control criteria relating to the encryption plus key-related data which will enable a key release agent to calculate the decryption key. The form of the access controlled decryption block is such that only a recognized key release agent can calculate the decryption key and no other entity can modify the access control attributes in a way which the key release agent would not detect.

Figure 2:
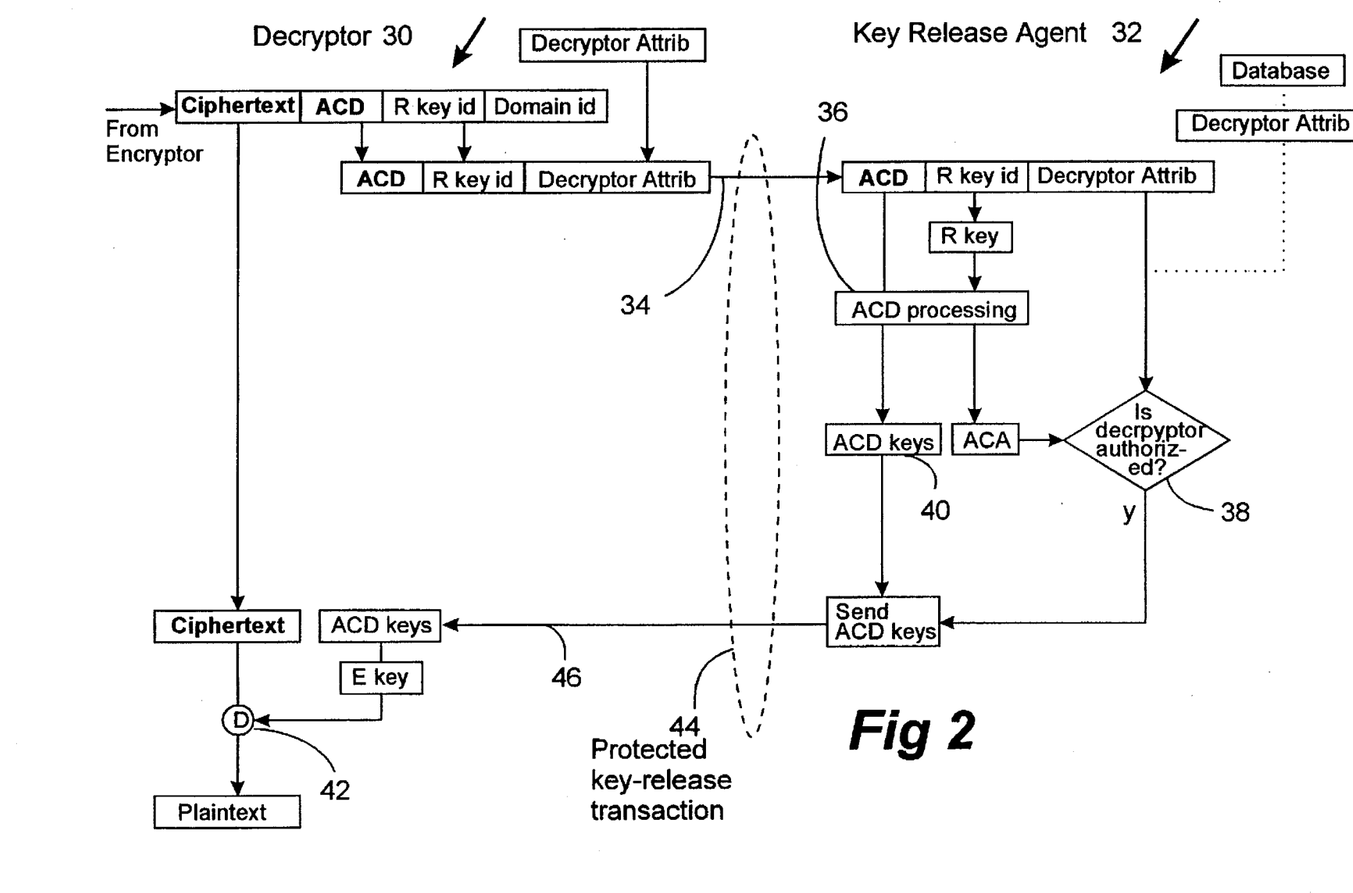

FIG. 2 is a functional schematic diagram of a decryptor and a KRA. To decrypt the ciphertext and ACD, a decryptor 30 obtains ACD keys through an on-line key-release transaction with a KRA 32. In this embodiment, the E key is the ACD keys but in other embodiments, the ACD keys may contain the E key as well as other keys which may be used to encrypt other parts of ACD, as will be further decribed below. Each KRA holds each R-key used in its domain. The decryptor initiates a key-release request by sending at 34 the ACD block and R key id. to the KRA. The KRA will also obtain decryptor privilege attribute information to verify that the requesting decryptor is appropriately authorized. This decryptor privilege attribute information may be just the decryptor's authenticated identity, which may be obtained in one embodiment through the key release transaction request using a suitable authentication mechanism. In another embodiment, more extensive decryptor privilege attribute information, e.g., group-membership, role-membership, or clearance information may be supplied by the decryptor in a certified form, e.g., a privilege attribute certificate signed by a trusted third party, or, in a yet further embodiment, the KRA may obtain decryptor privilege attributes from a supporting database as shown by a dotted line in FIG. 2.

Referring further to FIG. 2, using the R key identified by R key id., the KRA processes at 36 the ACD block and recovers the ACD keys and ACA. At 38 the KRA then makes an access control decision based on comparing the ACA (access control attributes) and the decryptor privilege attributes, which may be supplied by the decryptor through the key release request or by the database. If the decryptor is determined to be authorized, the KRA recovers the ACD keys at 40 and returns the plaintext ACD keys to the decryptor 30. The decryptor uses this E key in the ACD keys to decrypt the ciphertext and obtains plaintext at 42. The key-release transaction must be conducted using protected request and release messages 44. In particular, the request 34 must be protected by communications authentication and integrity mechanisms (e.g., by the decryptor digitally signing the request), and the response 46 must be protected by a communications confidentiality mechanism (e.g., by encrypting under a symmetric key shared by KRA and decryptor, or encrypting under a public key of the decryptor).

Figure 3:
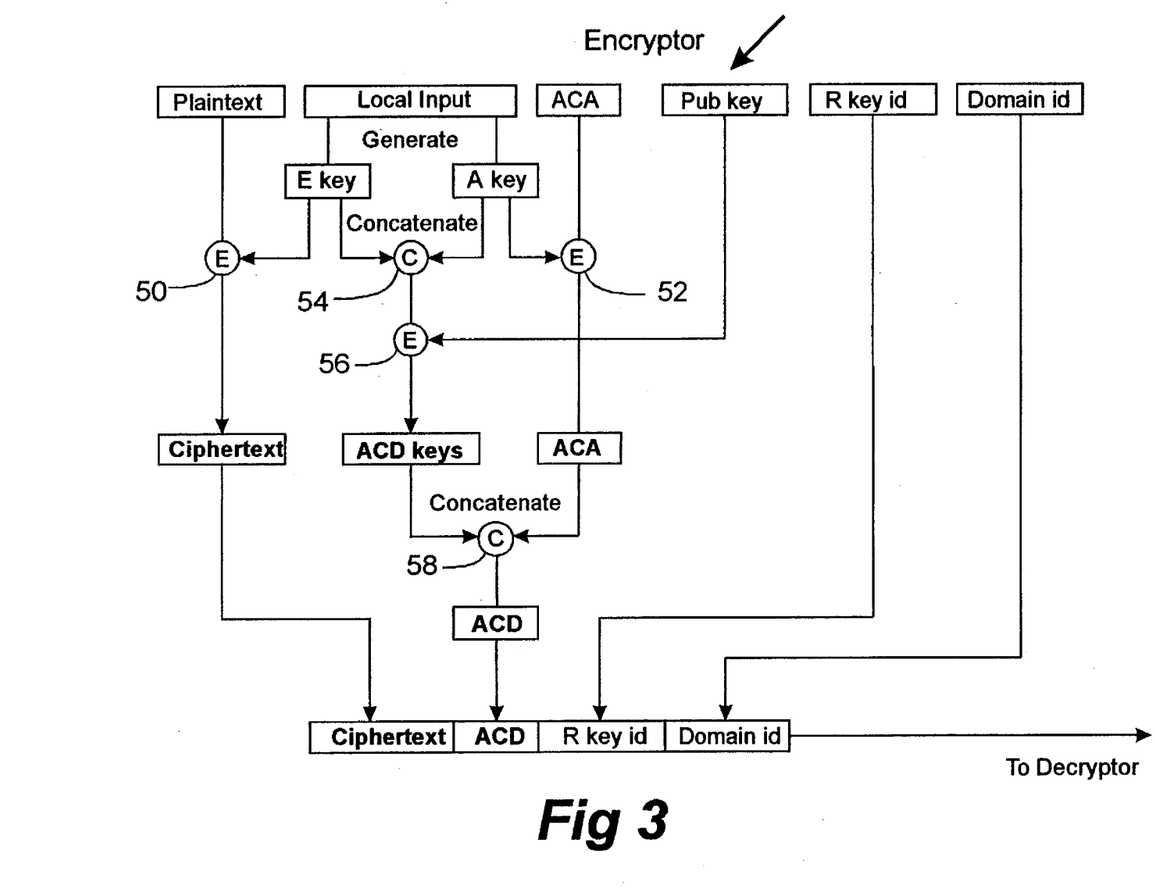
FIGS. 3 and 4 are functional schematic diagrams of an encryptor, a decryptor and a key release agent according to another embodiment of the present invention which is based on a reversible public key cryptosystem.

FIG. 3 is a functional schematic diagram of the encryptor according to another embodiment of the present invention. In this embodiment, ACD block generation and processing employ a reversible public key cryptosystem. Furthermore, the ACD keys are concatenated E key and A key. Thus the encryptor generates a random E key (message encryption key), and a random A key (ACA encryption key). A plaintext to be confidentiality-protected is encrypted at 50 to produce a ciphertext in a symmetric cryptosystem using the E key. The ACA is encrypted at 52 in a symmetric cryptosystem using the A key. At 54, the encryptor concatenates the E and A keys to create ACD keys and at 56 encrypts it with the key-release public key in a reversible public key cryptosystem. The ACA and ACD keys can be formatted with sufficient redundancy that encryption/decryption provides for integrity in addition to confidentiality. At 58, the encryptor inserts a copy of the encrypted ACD keys and the encrypted ACA in an ACD block. In this embodiment, an R key is a private key of a key pair in a reversible public key cryptosystem and is held by a trusted server system (KRA). When encrypting the ACD keys, the encryptor selects a key-release public key which comes with an identifier for the corresponding R key. The ACD keys are encrypted under the public key of the key-release key pair corresponding to the identified R key. The ciphertext, ACD block, R key id. and Domain id. are sent to the decryptor.

Figure 4:
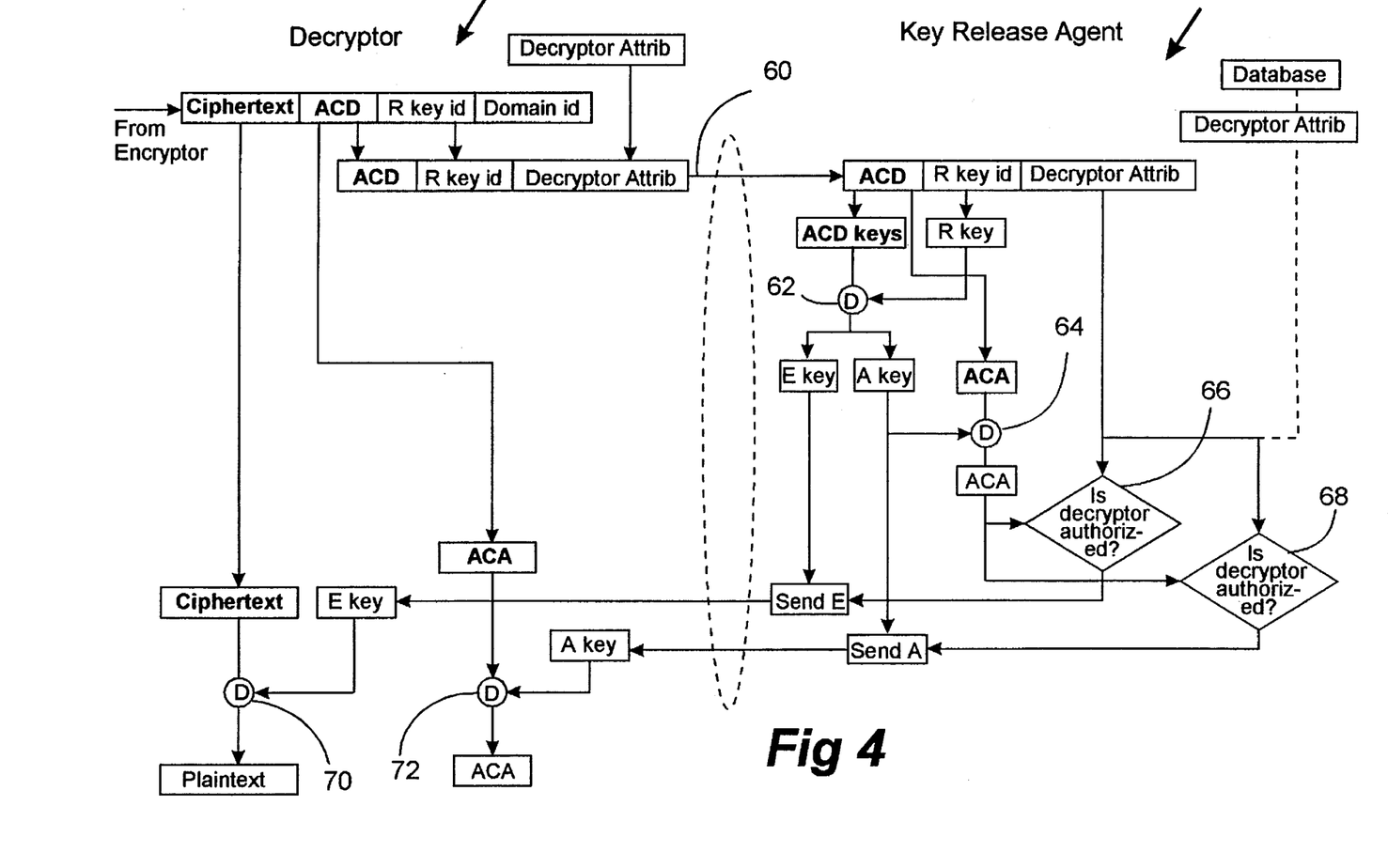

FIG. 4 is a functional schematic diagram of a decryptor and a KRA of the same embodiment. The decryptor obtains the E key and the A key through an on-line key-release transaction request 60 with a KRA. Using the R key identified by R key id., the KRA decrypts at 62 the ACD keys to obtain E and A keys from the ACD block. At 64, the KRA uses the A key to decrypt the ACA from the ACD block to recover the plaintext ACA. At 66 and 68, the KRA then makes access control decisions based on comparing the ACA and the decryptor privilege attributes. If the decryptor is determined to be authorized, the KRA returns the plaintext E key and, optionally, the plaintext A key to the decryptor. The decryptor uses the E key to decrypt the ciphertext and obtains plaintext at 70. If the A key is returned, the decryptor may use it to decrypt the ACA at 72.

Figure 5:
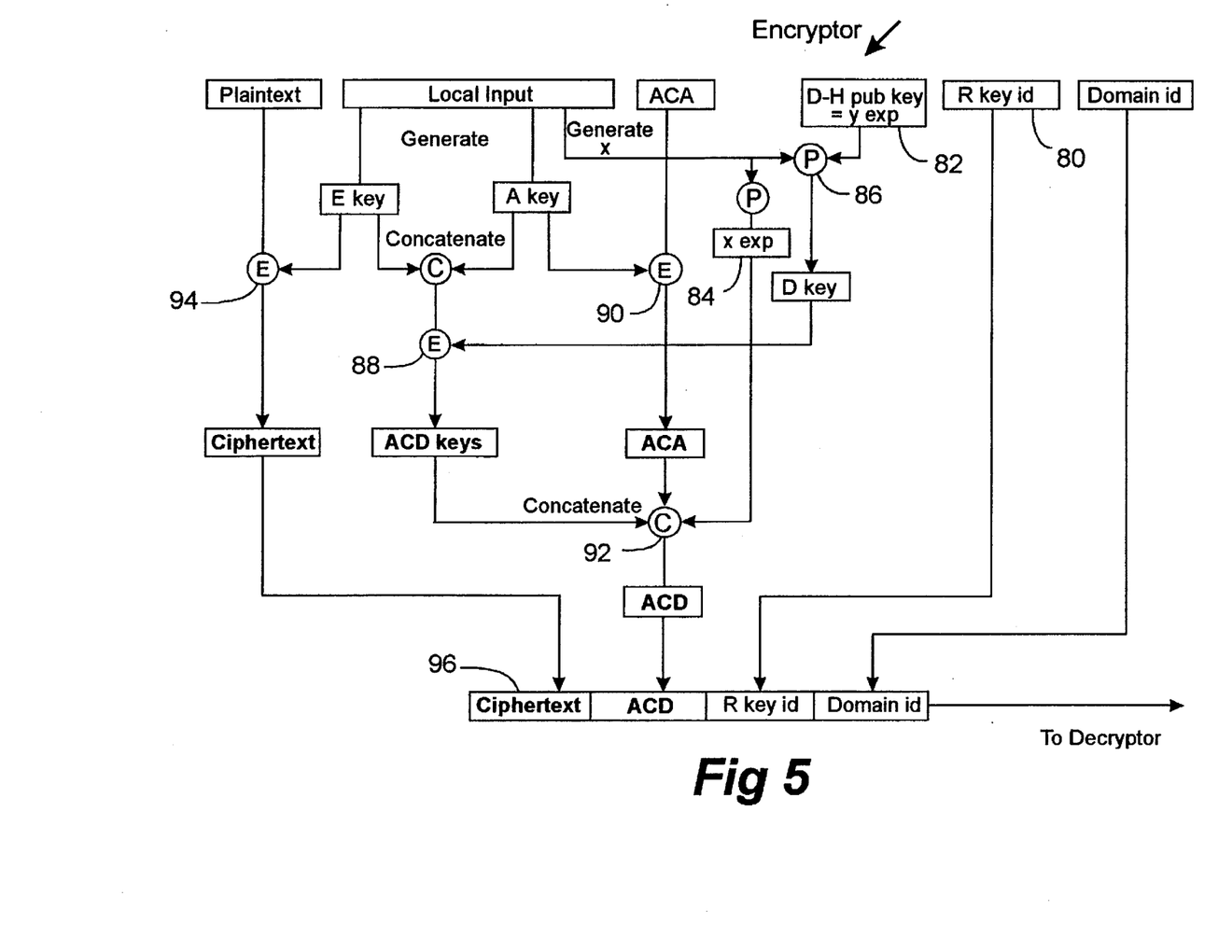
FIGS. 5 and 6 are functional schematic diagrams of an encryptor, a decryptor and a key release agent according to another embodiment of the present invention which is based on the Diffie-Hellman Key Derivation technique.
Figure 6:
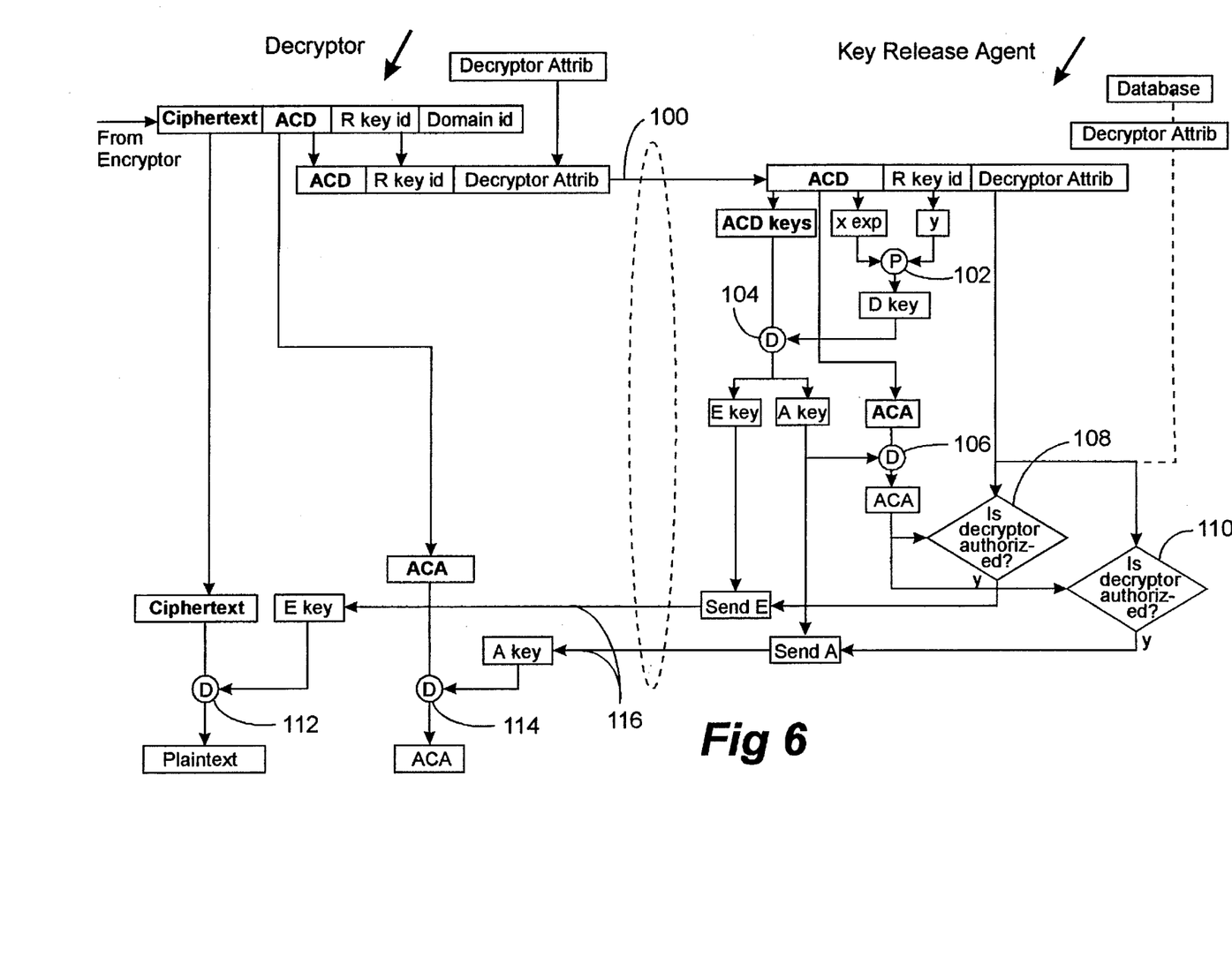

Referring now to FIGS. 5 and 6, yet another embodiment of the present invention is shown in which the encryptor uses the Diffie-Hellman key derivation technique instead of a reversible public key cryptosystem of FIGS. 3 and 4. In this embodiment, an R key is a secret random Diffie-Hellman exponent y and is identified by R key id. 80. Each KRA holds a copy of each R key used in its domain in a secure manner. Certified copies of the corresponding Diffie-Hellman y-exponential ($a^y$ mod p) 82 are made available to encryptors and thus this y-exponential is a public key. When encrypting a plaintext, the encryptor generates new random E and A keys and a random Diffie-Hellman exponent x. The encryptor then selects a y exponential (D-H public key) and may verify the signature on the applicable certificate. The x exponential 84 is computed as $a^x$ mod p, and a D key (D-H common key) is computed as $(a^y)^x$ mod p at 86. As in the earlier embodiment, the E and A keys are concatenated to produce ACD keys which are encrypted at 88 with the D key using a symmetric cryptosystem. The ACA is encrypted at 90 with the A key. The encrypted ACD keys, encrypted ACA, and the x exponential are inserted in an ACD block at 92. The protected parts of the ACD block can be formatted with sufficient redundancy that encryption/decryption of the block provides for integrity in addition to confidentiality. Meanwhile, the plaintext data is encrypted at 94 under the E key using a symmetric cryptosystem to produce a ciphertext. The ciphertext, ACD containing the encrypted parts and plaintext x exponential, R key id. and domain id. are joined at 96 and sent to the decryptor.

FIG. 6 shows the decryptor and KRA according to this embodiment. The decryptor is the same as that in the previous embodiment of FIG. 4 and initiates a key release request at 100 by sending to the KRA the ACD, R key id., and decryptor attribute information if required. When the KRA receives a key release request, it computes the D key at 102 as $(a^x)^y$ mod p, using the value y indicated by the R key id. This D key is then used at 104 to decrypt the encrypted ACD keys to extract the E and A keys from the ACD block. The A key is then used at 106 to decrypt the encrypted ACA in the ACD block. If subsequent access control decisions at 108 and 110 permit, the E and/or A keys are returned to the decryptor who uses the E key to decrypt the ciphertext at 112 to obtain the plaintext data, and uses the A key to decrypt the ACA at 114. The request 100 of the key-release transaction between the decryptor and the KRA must be protected by communications authentication and integrity mechanisms and the response 116 of the key-release transaction must be protected by a communications confidentiality mechanism.

Figure 7:
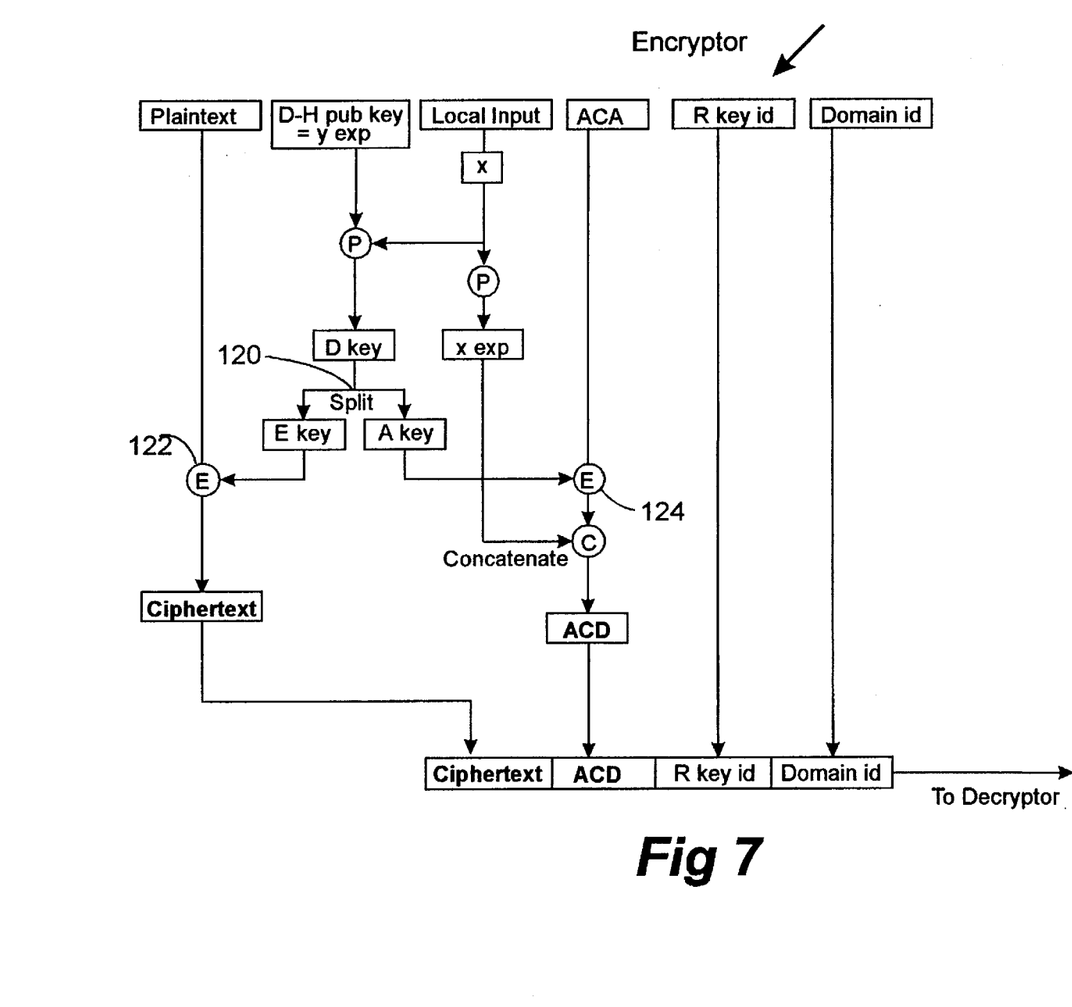
FIGS. 7 and 8 are functional schematic diagrams of an encryptor, a decryptor and a key release agent according to yet another embodiment of the present invention which is also based on the Diffie-Hellman Key Derivation technique.
Figure 8:
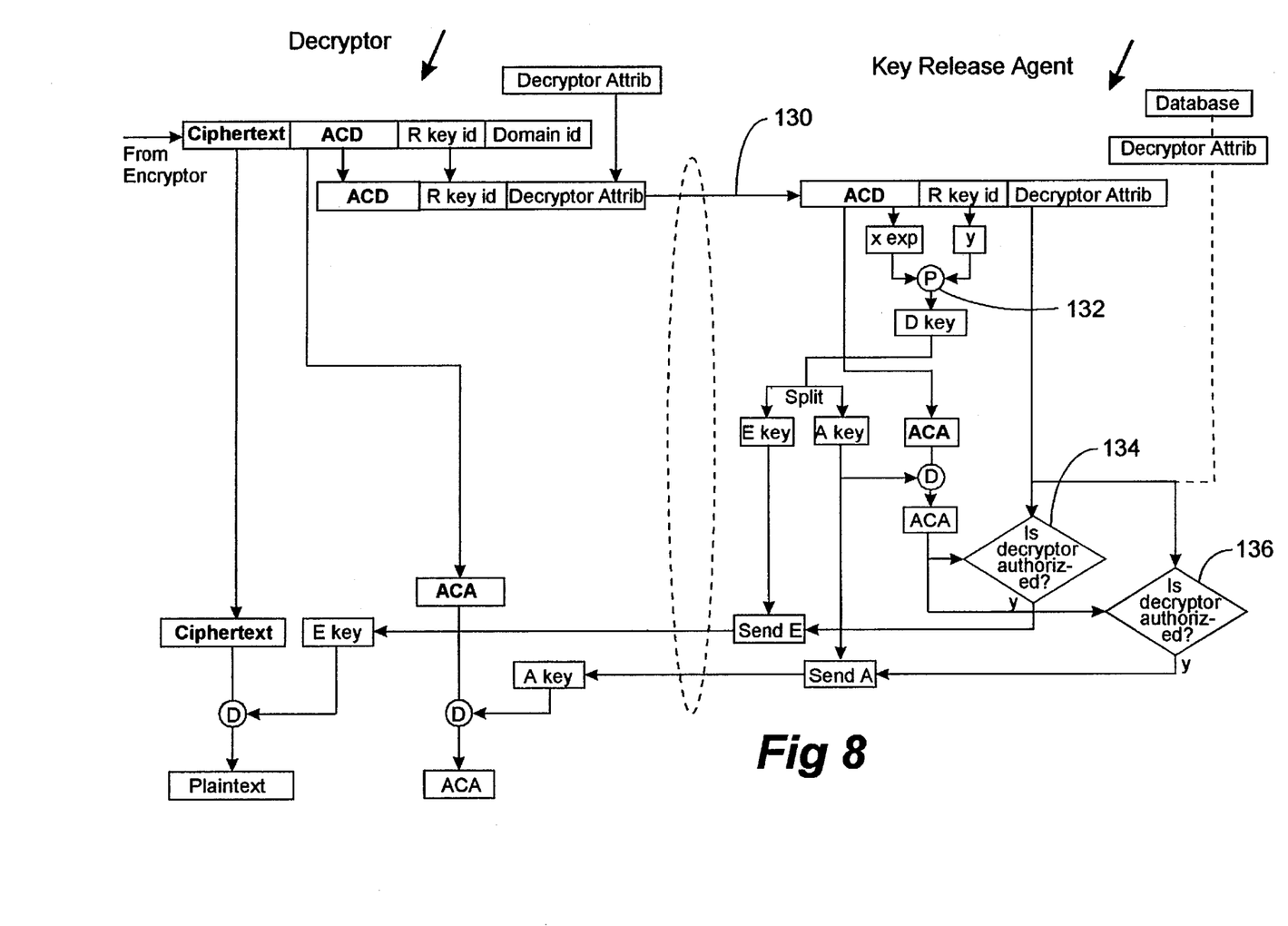

If the system is for use strictly within a single domain, a further simplification of the previous embodiment is possible. FIGS. 7 and 8 are functional schematic diagrams according to this further embodiment of the invention in which the ACD key, which contains the E and A keys is derived using the Diffie-Hellman key derivation technique. In this embodiment therefore, the D key generated in connection with the embodiment illustrated in FIGS. 5 and 6 is split into E and A keys at 120, with the E part used for encrypting the plaintext data at 122 to obtain a ciphertext, and the A part used to encrypt the ACA at 124. The encryptor need not generate E and A keys. They are simply computed from the x and y exponential which is a D-H public key. It is also not necessary to include the encrypted E and A keys in the ACD block. The decryptor functions are the same as those shown in the previous figures. Thus in FIG. 8, the decryptor initiates a key release request at 130 by sending to KRA the ACD, R key id., and optional decryptor attribute information. The KRA then recovers the D key at 132 and, depending on the access control decisions at 134 and 136, returns the E and/or A keys to the decryptor.

There may be situations where the E key should legitimately be released to an entity not covered by the access control attributes, e.g., a law enforcement agency with a court order enabling access to the encrypted data, or a corporate administrator needing to recover protected information after all authorized decryptors have ceased to exist. Therefore, according to another embodiment, the KRA is provided with key-escrow capability. In this embodiment, the KRA contains a special key release condition in its decision process. The KRA accepts a key release transaction from a party other than a decryptor authorized in accordance with the ACA provided special conditions are met, e.g., the request of that key release transaction is authenticated as being originated by a pre-specified number of special authorities, with keys required for authenticating special authorities being held by the KRA.

As described earlier, in the traditional electronic mail key distribution method, every participating user system is required to contain the encryption and decryption capabilities of a reversible public key cryptosystem. There may be a risk of such cryptographic capabilities being used for unintended encryption purposes. In the embodiments of the present invention, on the other hand, a participating user system is only required to have the encryption, but not decryption, capabilities of a public key cryptosystem. The decryption capabilities are only within a small number of closely controlled KRA systems. For this reason, it may be possible to obtain export approval for a stronger (e.g., larger modulus) public key cryptosystem than would be possible with the traditional method. Under the embodiments which uses the Diffie-Hellman technique, concerns over unintended use of cryptographically-strong implementations do not arise.

Unlike the known distribution techniques, the present invention does not require message encryptors or decryptors (recipients) to store sensitive secret information. Multi-message compromise can only result from compromise of an R key, which is stored in a small number of tightly controlled trusted server systems. Furthermore, the traditional method can support only simple lists of authorized individuals as decryptors but the present invention additionally supports such models as group-based models, role-based models, and multi-level models.

It should further be noted that the key-escrowing capabilities of the present invention compare favourably to other systems such as that specified in the U.S. Government Escrowed Encryption Standard (FIPS PUB 185), because:

a) It is not necessary to store large numbers of keys in a central highly protected location. Only a comparatively small number of R keys need to be stored in a highly protected manner (e.g., hardware cryptomodule) in KRAs.

b) Keys are released on a per-protected-item basis, i.e., release of the E key for one message does not automatically enable access to other protected data involving the same encryptor and/or decryptor. With the Escrowed Encryption Standard system, release of escrowed keying information needed to decrypt a single encrypted item means that all other encrypted data originating from the same encrypting device can also be decrypted without obtaining further interception authorization.

What is claimed is:

1. A method of publicly distributing a message encryption key through a computer network which includes an encryptor, a decryptor and a key release agent, comprising steps of:

the encryptor distributing an identifier associated with a key-release public-private key pair and distributing therewith an access controlled decryption block, the latter of which has been created using the key-release public key and contains key data related to the message encryption key and a statement of access control criteria with respect to the decryptor;

the decryptor sending to the key release agent the identifier and the access controlled decryption block in a locally protected transaction, said identifier indicating a key release private key corresponding to the key-release public key; and the key release agent recovering the message encryption key from the access controlled decryption block by using the key release private key and the key data in the access controlled decryption block, and sending to the decryptor the message encryption key if the decryptor is authorized to decrypt a message which is encrypted under the message encryption key.

2. The method of publicly distributing a message encryption key in a computer network according to claim 1, comprising a further step of:

the encryptor generating the access controlled decryption block by encrypting the message encryption key under the key-release public key in which the key-release public key and a key-release private key are a key pair of a reversible public key cryptosystem.

3. The method of publicly distributing a message encryption key in a computer network according to claim 1, comprising a further step of:

the encryptor generating the access controlled decryption block by encrypting the message encryption key under a symmetric key generated from the key-release public key by the Diffie-Hellman key derivation technique.

4. The method of publicly distributing a message encryption key in a computer network according to claim 1, comprising a further step of:

the encryptor generating the message encryption key by the Diffie-Hellman key derivation technique.

5. In a computer network for transferring message ciphertext encrypted under a message encryption key, a method of publicly distributing the message encryption key, comprising steps of:

an encryptor generating an access controlled decryption block, which contains key data related to the message encryption key and a statement of access control criteria with respect to authorized decryptors, both being protected with a key-release public key for which only a key release agent in a particular security domain has knowledge of the corresponding key release private key;

the encryptor distributing the access controlled decryption block, a security domain identifier, and an identifier of the key-release private key;

a decryptor sending to the key release agent in a locally-protected transaction a key release request which includes the access controlled decryption block, the identifier of the key-release private key, and decryptor attributes that include the decryptor's identity;

the key release agent recovering the message encryption key and access control attributes using data in the access controlled decryption block and the key release private key and determining, on the basis of the decryptor attributes and the statement of access control criteria in the access controlled decryption block, if the decryptor is authorized to decrypt the message ciphertext; and if the decryptor is so authorized, the key release agent sending the message encryption key to the decryptor in a locally-protected transaction.

6. The method of publicly distributing the message encryption key according to claim 5 further comprising steps of the encryptor:

encrypting the access control attributes under an access control encryption key;

encrypting both the access control encryption key and the message encryption key by using the key-release public key; and inserting the encrypted access control attributes, the access control encryption key and the message encryption key in the access control decryption block.

7. The method of publicly distributing the message encryption key according to claim 6 wherein the key-release public key is a key used in the Diffie-Hellman key derivation technique and the step of the encryptor sending to the decryptor includes a step of sending the access controlled decryption block, which further includes an exponential used in the Diffie-Hellman key derivation technique.

8. The method of publicly distributing the message encryption key according to claim 6, wherein the key-release public key is used in the Diffie-Hellman key derivation technique to generate a D key which contains the message encryption key and the access control encryption key.

9. The method of publicly distributing the message encryption key according to claim 5, wherein the step of the encryptor sending to the decryptor includes a step of sending the access controlled decryption block which further includes access control attributes describing authorization of the decryptor.

10. The method of publicly distributing the message encryption key according to claim 9 further comprising a step of the key release agent obtaining the decryptor attribute from a database on a separate channel.

11. A computer network in which a message encryption key is publicly distributed between an encryptor and a decryptor by way of a key release agent, comprising:

the encryptor including a transmitting device for transmitting to the decryptor through the network a ciphertext, an access controlled decryption block, and an identifier associated with a key release public-private key pair, the access controlled decryption block including a set of access control attributes and key data related to the message encryption key, the encryptor further including a message encryption device for producing the ciphertext using the message encryption key and ACD generation device for generating the access controlled decryption block using the key release public key;

the decryptor having a transaction device for sending the access controlled decryption block and the identifier together with a set of decryptor attributes to the key release agent in a locally-protected transaction; and the key release agent having the key release private key and ACD processing device for recovering the message encryption key and access control attributes by using the key release private key, the key release agent further including a determining device for deciding, based on the decrypted access control attributes and the decryptor attributes, whether the decryptor is authorized to decrypt the ciphertext and transmitting device for sending to the decryptor the message encryption key in a locally-protected transaction.

12. The computer network according to claim 11, wherein the encryptor further comprising an access control encryption device for encrypting the access control attributes under an access control encryption key and the ACD generation device encrypting the message encryption key and the access control encryption key under the key release public key.

13. The computer network according to claim 11, wherein the release key comprises a public key and a corresponding private key used in a reversible public key cryptosystem, the encryptor having the public key and the key release agent having the private key.

14. The computer network according to claim 12, wherein the release key comprises a public key and a corresponding private key used in a reversible public key cryptosystem, the encryptor having the public key and the key release agent having the private key.

15. The computer network according to claim 11, wherein the release key comprises a key generated by the Diffie-Hellman key derivation technique.

16. The computer network according to claim 12, wherein the release key comprises a key generated by the Diffie-Hellman key derivation technique.

17. The computer network according to claim 13, wherein the message encryption key and the release key are same and comprise a key generated by the Diffie-Hellman key derivation technique.

18. The computer network according to claim 12, wherein the key release agent further comprises a key escrow device for determining if a third party other than the encryptor and decryptor is authorized to decrypt the ciphertext.

19. The computer network according to claim 12, wherein the key release agent further comprises a telecommunications channel connected to a database for obtaining the decryptor attributes.

* * * * *